(12) United States Patent
Berger et al.

(10) Patent No.: US 7,172,640 B2
(45) Date of Patent: *Feb. 6, 2007

(54) METHOD AND DEVICE FOR MELTING DOWN METAL-CONTAINING MATERIALS

(75) Inventors: Harald Berger, Linz (AT); Peter Mittag, Linz (AT); Bernhard Aigner, Offering (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 10/021,373

(22) Filed: Oct. 22, 2001

(65) Prior Publication Data

US 2002/0083794 A1 Jul. 4, 2002

Related U.S. Application Data

(63) Continuation of application No. PCT/AT00/00101, filed on Apr. 20, 2000.

(30) Foreign Application Priority Data

Apr. 22, 1999 (AT) .................................. A 718/99

(51) Int. Cl.
 *C21B 13/12* (2006.01)
(52) U.S. Cl. ..................................... 75/10.35
(58) Field of Classification Search .............. 75/10.63, 75/10.66, 10.1, 10.23, 10.15, 10.16, 10.21, 75/10.24, 10.25, 10.26, 10.27, 10.35; 266/177, 266/187, 188, 93, 80, 78, 186; 373/81
See application file for complete search history.

(56) References Cited

U.S. PATENT DOCUMENTS 2,894,831 A 7/1959 Old et al.
3,307,935 A * 3/1967 Lindholm ..................... 75/543
5,573,573 A * 11/1996 Berger et al. ............... 75/10.63
5,641,336 A * 6/1997 Roth ........................... 75/414
5,827,474 A * 10/1998 Usher et al. .................. 266/44
5,835,524 A * 11/1998 Berger et al. ................. 373/79
5,946,339 A 8/1999 True ............................ 373/72

(Continued)

FOREIGN PATENT DOCUMENTS

DE 255 67 14 12/1975

(Continued)

OTHER PUBLICATIONS

Merriam-Webster's Collegiate Dictionary Tenth Edition 1998 p. 802.*

*Primary Examiner*—Roy King
*Assistant Examiner*—Kathleen McNelis
(74) *Attorney, Agent, or Firm*—Pitney Hardin LLP

(57) ABSTRACT

In a method and a device for melting down metal-containing material, preferably fine-particulate metal-containing material, such as sponge iron, in a metallurgical melting furnace (1), wherein, in an interior space (11) of the melting furnace (1), a metal melt (5) and a slag layer (6) floating on top of the metal melt (5) are maintained, the metal-containing material is added by means of a supply means dipping into the slag layer (6) and energy is added in the form of electric arcs (14), the metal-containing material is charged directly into the central region (Z) of the melting furnace (1) by means of at least one charging tube (8) exclusively serving for conveying material via the charging tube outlet (9) of the same, the electric arcs (14) are directed obliquely towards the metal melt (5) against the central region (Z) of the melting furnace (1) and the metal-containing material is melted in the slag layer (6) and a mixed process slag-metal melt is maintained in the region of the charging tube outlet (9).

16 Claims, 5 Drawing Sheets

U.S. PATENT DOCUMENTS 6,241,798 B1 * 6/2001 Dimitrov et al. .......... 75/10.63
6,524,362 B1 * 2/2003 Eichberger et al. ........ 75/10.46

FOREIGN PATENT DOCUMENTS

| DE | 33 26 505 A1 | 7/1983 |
| DE | 36 21 323 A1 | 6/1986 |
| DE | 196 08 530 A1 | 3/1996 |
| DE | 197 44 151 A1 | 10/1997 |
| EP | 0 134 852 A1 | 9/1983 |
| EP | 0 462 713 A1 | 5/1991 |
| EP | 0 663 450 A1 | 1/1995 |
| FR | 670.910 | 3/1928 |
| FR | 1481142 | 4/1966 |
| GB | 2 115 011 A | 9/1983 |
| WO | WO 93/13228 | 7/1993 |
| WO | WO 99/18245 | 4/1999 |

* cited by examiner

METHOD AND DEVICE FOR MELTING DOWN METAL-CONTAINING MATERIALS

This application is a continuation of PCT/AT00/00101, filed Apr. 20, 2000, which is incorporated by reference herein. PCT/AT00/00101 was published in German under Publication No. WO/00/65102.

The invention relates to a method and a device for melting down metal-containing material, preferably fine-particulate metal-containing material, such as sponge iron, in a metallurgical melting furnace, wherein, in an interior space of the melting furnace, a metal melt and a slag layer floating on top of the metal melt are maintained and the metal-containing material is added by means of a supply means dipping into the slag layer and energy is added in the form of electric arcs.

BACKGROUND OF THE INVENTION

A big unsolved problem is the processing of large amounts of fine-particulate metal-containing material, for example of one million tons per year. Until today, the charging, most often blowing, of fine-particulate material into metallurgical melting furnaces, for instance electric furnaces, has been limited only to the processing of relatively small amounts, whereby the fine-particulate material accrues as breeze or waste. Currently, fine-particulate metal-containing material is foreseen merely as an addition to other metal-containing material being charged into the melting furnace in lumps or in the form of pellets or briquettes, respectively.

The plant-related reliability of the blow-in plants used for charging the fine particles is small, and the operating and maintenance costs are relatively high. It is not possible to supply the fine particles to the melting furnace, for instance, via a simple chute, since, due to the gas flow conditions prevailing in the melting furnace caused by low pressure, the fine particles would immediately be withdrawn from the furnace space through the suction means with which every melting furnace is provided. In order to avoid that problem, so far either the ore dusts have been processed to ore pellets in pelleting plants prior to being reduced or the reduced fine-particulate material has been processed to briquettes in hot briquetting plants and thus they have been rendered applicable for the conventional charging devices of melting furnaces. Those plants, however, do bring about very high investment costs.

Dusts of melting furnaces such as they accrue, for example, during the production of steel also have to be pelletized at high costs prior to being reused in a reduction aggregate, provided that they can be recycled at all and do not have to be dumped. It is not possible to directly use the dusts for reutilization purposes in the steel production.

All sponge metal products end up being hot after production, sponge iron, for example, with a temperature of more than 600° C. For a long time, it has been the wish of steel mill engineers to use that heat immanent to the charge material. However, due to equipment-related difficulties (pneumatic conveyance) or logistical problems (transport of containers), that could not be realized. The energy yield obtained by the supply of 100% sponge iron of a temperature of approximately 600° C. would amount to, for instance, more than 100 kWh/t liquid steel, which, so far, has been impossible to be made use of.

In order to prevent the directly-reduced fine particles from becoming reoxidized and in order to blow the fine particles into the melting furnace, moreover, large amounts of inert gases are necessary, with the costs for those inert gases rendering those methods more expensive.

When melting down metal in an electric arc furnace, great energy losses occur which have been caused by the significant amounts of energy being withdrawn by the hot off-gas and in the following by the wall and lid cooling of the furnace vessel and the cooling of the hot gas duct. So far, it has not been possible to even only partially reuse those large withdrawn amounts of energy. A method which would render that feasible could have other significant advantages with regard to its economic efficiency.

In a method according to the initially described kind, known from EP 0 134 852 A1, sponge iron particles having a great amount of fine-particulate material are fed into a melting furnace, whereby the feeding of the sponge iron into the melt is preformed in a gravitative manner via one to two inerted storage vessels by means of screw conveyors.

That, however, brings about the disadvantage that, due to the mutual reaction occurring between the sponge iron and the components of the slag during melting, boiling reactions and gas formations take place, which lead to gas flow conditions in the interior space of the melting furnace which counteract strongly to an introduction via gravity of the mostly fine-particulate iron particles and entrain the same so that the output is impaired extremely. Furthermore, it can be regarded as a disadvantage that a substantial wear of the mechanical conveying device expanding immediately into the metallurgical melting furnace (in its high temperature region) is the result.

It is known from EP 0 462 713 A1 how to charge iron-containing particles by the aid of a feeding device designed as a screw conveyor or a pneumatic conveying system. Hereby, a conveying tube of the feeding device expands obliquely into the high temperature region of the furnace, optionally partially into the slag, via an opening in the sidewall of the melting furnace.

Besides the gas flow conditions also occurring therein and having a negative effect on the conveyance, increased equipment-related expenditures and expenditures with regard to the technical operation are necessary in order to attain a high charging level of the material to be charged in the described manner, whereby also in that case the strain on the mechanical components of the feeding device occurring during the charging of hot particulate material represents a problem.

According to DE 36 21 323 A1, the supply of the metal-containing material into the melting furnace is carried out through the channel of a hollow electrode, which simultaneously supplies energy for melting the metal particles and the slag formers and for maintaining a metal bath.

The main disadvantage of that method consists in that the cross section of the electrode and hence the diameter of the channel are subject to a limitation depending on the current density necessary for the melting. Therefore, it is not possible to increase the dimensions of the electrode to any desired extent in order to obtain a higher charging portion of the metal-containing material. That way of supplying the metal-containing material, therefore, does not allow the use of the method for the production of steel to an extent customary today, since in doing so it would not be feasible to melt the amounts of reduced iron necessary for an efficient steel production.

A method of the initially described kind is known from WO 99/18245 A. Herein, by means of one or several lances, fine-grained, directly-reduced iron, optionally in the hot state, is fed into the foamed slag maintained in an electric arc furnace having vertical electrodes and is melted. The supply may be carried out merely by gravity according to WO 99/18245 A but also by means of a conveying gas.

However, that method has the drawback that by means of the lance only a small amount of sponge iron (DRI) can be produced, since the interior diameter of lances usually does not exceed 100 mm. However, when using several lances in order to increase the conveying capacity, it is difficult to uniformly supply those with conveying material.

That method has the further disadvantage that an introduction of charging material into the energetic centre of the furnace is not feasible, which, in case of higher conveying rates, results in the clogging of the lances, since it is not possible to melt the conveying material quickly enough. If several lances are arranged around a central D.C. electrode, that results in the material introduced via the separate lances being melted in different ways, since the electrode's electric arc forming the energetic centre of the furnace burns against the furnace bottom with a deflection against the horizontal line of about 5°. Since, furthermore, the electric arc only has small spatial dimensions, there is a substantially larger energy supply at one particular circumferential spot of the electrode than at other circumferential spots. Hence, with the concentric arrangement of the lances according to WO 99/18245, it is impossible to introduce the entire fine-grained iron material into the energy centre In accordance with a further embodiment according to WO 99/18245, the electric arc has three A.C. electrodes, which, at uniform intervalls from each other, are arranged on a circle in the interior of the furnace. Inside the electrode circle, three lances provided for supplying the material are arranged concentrically. Apart from the practically existing lack of space for the lances inside the electrode circle, that lance arrangement also has the problem that melting takes place nonuniformely, since, due to their inherent resistance, the electric arcs burn to the outside and hence no energetic centre is formed inside the electrode circle.

From DE-A1-197 44 151 it is known to surround, in an electric arc furnace run by direct current, a centrically arranged electrode that projects vertically into the same by blowing-in lances, these lances projecting as far as into the slag layer. For alternating current, three electrodes that project vertically into the electric arc furnace are provided, between which three charging lances are arranged.

From DE 196 08 530 A, a method for the treatment of steel in an A.C. electric arc furnace having three electrodes arranged on a circle is known, wherein solids to be charged into the furnace are blown in by means of $CO_2$ via a lance below the slag surface in the region of the electrodes.

Due to the electric arcs directed towards the outside in an A.C. furnace, no formation of an energy centre takes place. Also with that prior art, the solids are not charged into an energetic centre, which does not render feasible any higher conveying rates. Another disadvantage of that method is the expenditure for the pneumatic conveyance of the solids via the lances into the furnace.

According to U.S. Pat. No. 5,946,339 A, via a supply tube, DRI and fluxing agents are charged into an electric arc furnace having two electrodes, which are arranged at a distance from each other, so that, between them, the charging material falls into the slag located in the furnace. Thereby, a debris cone forms below the tube opening not dipping into the slag.

Due to the distance between the electrodes necessary for introducing the charging material, the energy is not centred at the spot where the solids are introduced, which makes a quick melting of the conveying material impossible.

From U.S. Pat. No. 2,894,831 A, an electric melting furnace is known which has two inclined electrodes serving for melting reduced iron powder, whereby, centrally above the melting furnace, a shaft is provided in which a material column standing of the furnace bottom is formed, by which shaft the electrodes are forcibly supplied with material to be melted.

However, the great distance of the only very slightly inclined electrodes caused by the shaft avoids the formation of an energy centre in the region of the material charge and hence slows down the melting process.

An electric arc furnace for melting down iron carriers, such as scrap, is known from EP-A1-0 663 450, a central charging shaft being provided above a furnace interior space. This charging shaft ends at the furnace covering and serves as a pre-heating shaft for scrap, wherein, for the purpose of pre-heating the iron carriers, off-gases of the interior space of the furnace via a gas-permeable cut-off device at the lower end of the charging shaft flow into the same and leave the charging shaft at the upper end. Fine-grained charging material is additionally charged via bottom-belt nozzles, lances or hollow electrodes.

A charging means for an electric arc furnace for charging scrap, in particular car scrap, is known from WO 93/13228. This charging means has a charging tube which may be raised and lowered, projecting into the interior space of the electric arc furnace. Raising and lowering of the lower end of the charging tube serves the purpose of being able to adjust the diameter of the scrap column formed by the scrap packages. Charging is effected out of center and at a quite large distance from the electrodes projecting vertically into the interior space of the electric arc furnace.

If large amounts of fine-particulate metal-containing material are to be processed, one is therefore currently forced to render the fine particles lumpy in investment intensive plants for pelletizing prior to reducing or briquetting after reducing in order to obtain the amounts necessary for an efficient steel production, whereby, however, the advantage of small raw material costs as opposed to lumpy ore is lost.

SUMMARY OF THE INVENTION

The present invention aims to prevent the mentioned disadvantages and difficulties and has as its object to create a method and a device which make it possible to melt metal-containing material having a portion of fine particles of up to 100% in large amounts in a metallurgical melting furnace without a discharge of the metal particles occurring due to the gas flow conditions prevailing in the interior space of the melting furnace. Furthermore, the equipment-related expenditure and the expenditure with regard to the technical operation for charging the metal-containing material is to be kept low; investment and operational costs are to be minimized. A mode of charging as simple as possible and hardly comprising any mechanical components is to be provided. In particular, the wear of the charging means when charging hot metal-containing material is to be strongly decreased, so that breakdowns caused by maintenance works may be minimized. An essential object is to be seen in that a great melting capacity is attained despite a large portion of particles to be melted.

According to the invention, that object is achieved in that the metal-containing material is fed directly into the central region of the melting furnace by means of at least one charging tube exclusively serving for conveying material via the charging tube outlet of the same, in that, obliquely against the central region of the melting furnace, the electric arcs are directed towards the metal melt and in that the metal-containing material is melted in the slag layer and a mixed process slag-metal melt is maintained in the region of the charging tube outlet.

DETAILED DESCRIPTION OF THE PREFERRED EMBODIMENTS

Figure 1:
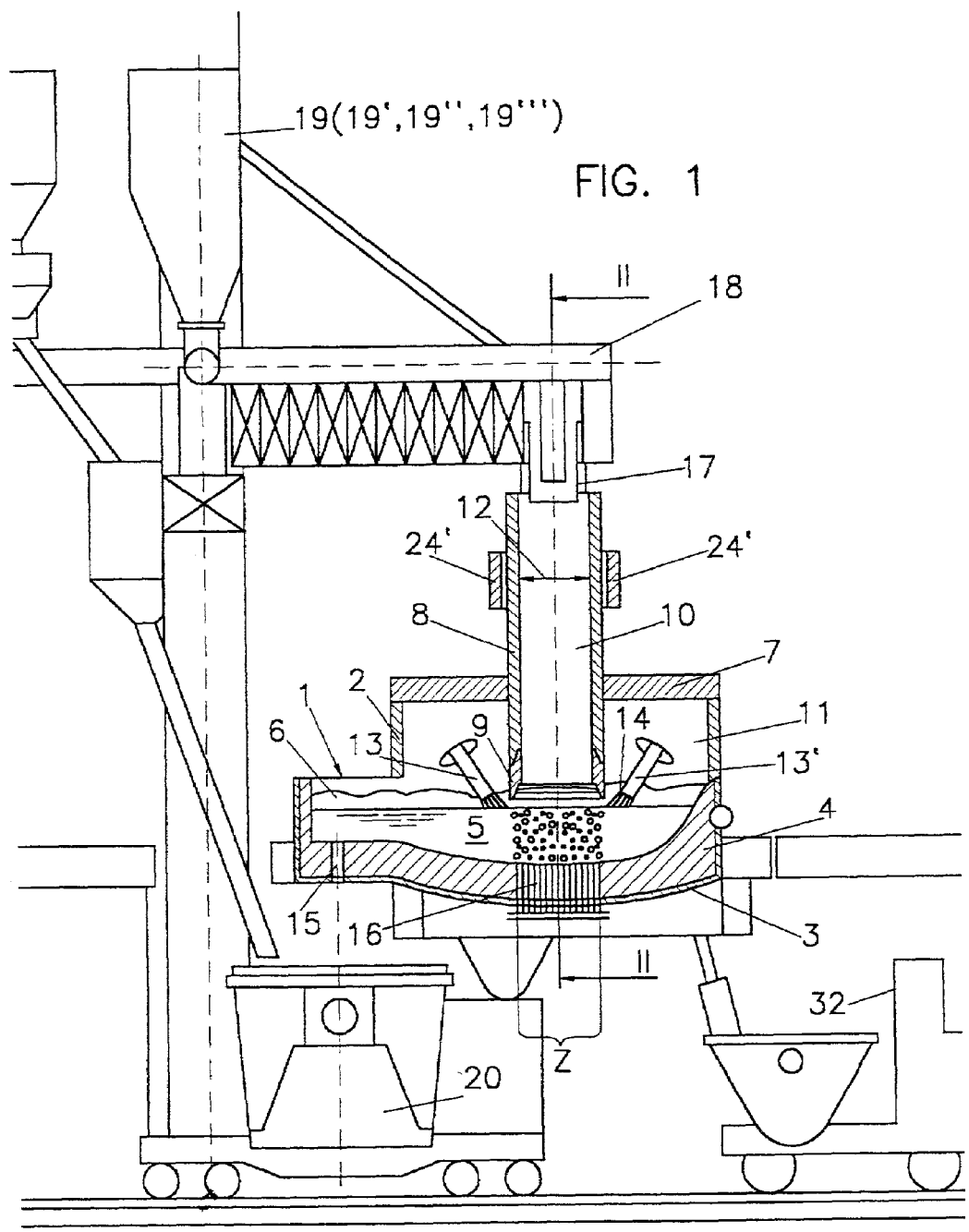
FIG. 1 is a schematic of a plant arrangement including a cutaway view of a furnace and charging tube arrangement, in accordance with the invention.

By constantly dipping the charging tube into the slag layer, a separate space independent from and unaffected by the conditions of the melting furnace's interior space located above the slag layer emerges, in which separate space the metal-containing material, such as fine-particulate sponge iron, may drop undisturbedly into the slag and is not withdrawn from the melting furnace by the stack effect caused by the hot gases flowing from the metallurgical melting furnace. Those hot off-gases would also flow through a tube whose interior space is directly connected with the melting furnace's interior space located above the slag layer. The metal-containing material, in particular fine particles, would be blown out. The rising reaction gases forming in the slag during the dissolution of the fine-particulate metal-containing material in the method of the invention do not possess enough strength in order to entrain the particles of the metal-containing material to above but they only lead to a better blending of slag and metal-containing material, which facilitates the melting of the particles of the metal-containing material.

Due to the electric arcs or electrodes, respectively, being directed obliquely against the central region of the melting furnace and the simultaneous charging of the metal-containing material into the very same region, the process of melting down the metal-containing metal is accelerated, since an energy centre forms in the region of the charging tube outlet, which energy centre provides the metal-containing material with a surplus amount of energy immediately after its charging. That substantially increases the efficiency of the method.

A charging tube projecting centrically through a covering of an electric arc furnace, for charging formed pieces such as granules, pellets, or the like, which may be raised and lowered relative to the covering, is known from DE-A1-25 56 714. The raising and lowering capacity serves the purpose of adjusting the optimum height above the electric arc of the electrodes projecting vertically through the covering of the electric arc furnace into its interior.

In order to attain a quick melting of the metal and within a short period of time a particularly thorough mixing of the metal-containing material with the slag at the outlet of the charging tube, it is advantageous to supply the energy necessary therefor in the immediate vicinity of the lower charging tube end.

Suitably, the metal-containing material is charged in lumpy and/or fine-particulate form. A particular advantage is derived from the method according to the invention if exclusively fine-particulate material is used. So far, it has not been feasible to efficiently process large amounts of, for instance, a million tons per year of fine-grained sponge iron to steel. The ore dust accruing in large amounts, which is available on the raw material market at very favourable prices, therefore, had to be rendered usable for the direct reduction in pelletizing plants of high investment and operational costs for the production of ore pellets or the produced fine-particulate sponge iron had to be processed to sponge iron briquettes in hot briquetting plants after the direct reduction. However, the invention offers the possibility of substantially lowering the production costs for the liquid metal, and that solely by the use of ore dust.

According to a preferred embodiment of the method of the invention, the metal-containing material is charged into the melting furnace through the charging tube in the hot and/or cold state, preferably at a temperature of between 500° C. and 1000° C., most preferably of between 600° C. and 700° C., which roughly corresponds to the temperature sponge iron has after being directly reduced. In that manner, energy costs can be saved, if, prior to being melted down, the charging material was subjected to a process which led to an increase in temperature of the particles, since the energy immanent to the charged material may be used for lowering the necessary melting energy consumption without any particular plant-related technical expenditures. That is rendered feasible by the particularly simple charging according to the invention, which does not necessitate any mechanical elements in the high temperature region of the melting furnace.

A preferred application of the method is carried out in connection with a direct reduction process, whereby the melting method of the invention is applied immediately after the direct reduction process.

In order to produce the electric arcs, inclined electrodes are used, which, advantageously inclined at an angle of from 20° to 70° against the horizontal line, are directed towards the metal bath against the centre of the melting furnace (e.g. of an electric arc furnace) in whose region the charging tube or the charging tubes, respectively, are located, and which surround the charging tube or the charging tubes, respectively, in a closely adjoining arrangement, since that renders feasible a particularly fast melting of larger amounts.

Advantageously, in their normal position with reference to the bath level, the electrodes aim at a partial circle roughly in the centre between the outer surface of the charging tube and the interior outline of the hearth brick lining.

Particularly advantageously, the electrodes—seen in the ground plan—are directed radially towards the centre of the melting furnace and tangentially towards various partial circles with reference to the centre.

In a preferred embodiment, the electrode tips may be adjusted variably with regard to their distance from the charging tube by changing the angle of inclination of the electrodes and the electrode stroke.

Preferably, a foamed slag is formed on the metal bath in the metallurgical melting furnace, which foamed slag is generated, for instance, by blowing in gaseous oxygen under the possible addition of fine-grained carbon. The foamed slag enables a quick melting of the metal-containing particles, since the thermal efficiency of the electric arcs burning in the foamed slag and being shielded off by the same is particularly high.

For the purpose of an additional turbulence of the metal bath and the slag, the melting furnace may preferably be flushed by means of a gas which rises via a gas flushing stone installed in the melting furnace and which promotes the melting of the charged metal-containing material in the hot slag.

A preferred embodiment of the invention consists in that the charging material is introduced into the slag via the charging tube exclusively by the aid of gravity. Suitably, for that purpose, the charging tube is configured as a downpipe and is positioned in the melting furnace vertically or at a suitable angle against the vertical axis.

Due to the fact that the bath level rises during charging, the charging tube is adjustable in height and may be raised and lowered, respectively. For replenishing parts of the charging tube or for changing the furnace vessel, the charging tube may also be movable sideways to a position beside the melting furnace.

In order to ensure a permanent dipping of the charging tube outlet into the slag layer during charging and melting, respectively, the insertion depth of the tube, which amounts to at least 10 mm, may be monitored by means of an adjusting and/or controlling means. That adjusting and/or controlling means is based upon a measurement of the charging rate of the charged material and upon a measurement of a voltage and/or a current at/in the electrically conductive charging tube. The amount of the charged metal-containing particles determines the level of the slag layer in the melting furnace and thus enables the adjusting and/or controlling means to adapt the insertion depth of the charging tube with reference to the slag level by the aid of a device for raising and lowering the charging tube. Furthermore, the charging tube is supplied with an auxiliary voltage, and, from the change of the voltage and/or the current measured, the position of the lower charging tube end is determined via a distance measuring, and an according reaction is chosen. Both measures are applied in combination.

That adjusting and/or controlling means is particularly advantageous if the metal-containing material is melted discontinuously, since, in doing so, changes of the metal and slag layer levels occur. A continuous melting is feasible as well, whereby the metal and slag layer levels are kept roughly constant, so that an adjustment in height of the charging tube outlet is—if at all—necessary only rarely and to a small extent.

With a preferred embodiment, the inside diameter of the charging tube amounts to 200 to 1500 mm, preferably to 600 to 800 mm.

Preferably, the charging tube is manufactured from an electrically conductive material, in particular from amorphous carbon or graphite. In order to increase its lifetime, the charging tube may be coated with $Al_2O_3$ on the outside or may be furnished with a water spray cooling system. But also a fireproof material or tubes cooled by means of water or water vapour may be used as charging tube materials.

Preferably, the charging tube is manufactured from several shots which are screwed together and are exchangeable separately and may quickly be exchanged at a charging tube maintenance and/or changing station towards which the charging tube may be pivoted.

A particular advantage emerges if water vapour is used for cooling the melting furnace and a hot gas duct of the off-gas means. That hot water vapour may advantageously be employed for the production of a reducing gas in a plant for the production of reducing gas, such as a reformer.

Advantageously, the dust-loaded off-gas emerging from the charging tube and the charging chute is sucked off via a secondary suction system and the off-gas emerging from the metallurgical melting furnace is sucked off via a hot gas duct, both off-gas flows are united in an off-gas tube cooled by means of water or water vapour and together they are charged into a off-gas purification means, from where the dust withdrawn from the off-gas may be resupplied to a direct reduction plant, so that it may return to the metal processing process, thus increasing the output.

A method according to the invention for melting down metal-containing material, preferably fine-particulate metal-containing material, such as sponge iron, in a metallurgical melting furnace, whereby, in an interior space of the melting furnace, a metal melt and a slag layer floating on top of the metal melt are maintained, the metal-containing material is added by means of a supply means dipping into the slag layer and energy is added in the form of electric arcs, is characterized in that, exclusively by the aid of gravity, the metal-containing material is directly charged into the central region of the melting furnace by means of a single central charging tube serving exclusively for conveying material and having an inside diameter of at least 300 mm, preferably 600 mm, via its charging tube outlet, the electric arcs are directed obliquely towards the metal melt against the central region of the melting furnace, inclined at an angle of from 20° to 70° to the horizontal line, and the metal-containing material is melted in the slag layer and a mixed process slag-metal melt is maintained in the region of the charging tube outlet.

A device according to the invention for melting down metal-containing material, preferably fine-particulate metal-containing material, such as sponge iron, in a metallurgical melting furnace, whereby the melting furnace is furnished with electrodes for the supply of energy to a metal bath covered by a slag layer as well as with an adjustable supply means dipping into the slag layer for charging the melting furnace with the metal-containing material, characterized in that the supply means has a single centrally-arranged charging tube serving exclusively for conveying material and being configured as a downpipe, which charging tube has an inside diameter of at least 300 mm, preferably at least 600 mm, and expands into the central region of the melting furnace and that the electrodes are directed obliquely towards the central region of the melting furnace, inclined at an angle of from 20° to 70° to the horizontal line.

If melting down metal-containing fine-particulate material is coupled to a direct reduction plant, the product capacities of the continuously running reduction plant (approximately half a year of uninterrupted operation) and of the metallurgical melting furnace (a furnace campaign lasts for approximately three weeks, in between fireproof repair works) advantageously are designed and correlated such that, during a furnace shutdown period, i.e. during exchanging the melting furnace for an intact, freshly bricked melting furnace, the reduced material is collected, preferably in a bunker system, and the collected reduced material is conveyed into the new melting furnace at an increased charging rate and is melted down therein until it has been finished completely and the previous ratio of the material amounts coming from the reduction plant and being charged into the melting furnace has been restored. That renders an additional plant for briquetting the accrued reduced material superfluous.

That is done in that
a quick furnace change is foreseen. For that, it is necessary to design all connections for
cooling water/water vapour
electric energy
instrument leads for a quickly active sealing and a quick connecting and locking;
the layout of the steel works is designed such that a complete vessel change may be carried out within 120 to 240 minutes. The vessel change may be performed by means of a crane or a floor vehicle within the prescribed time.

Figure 2:
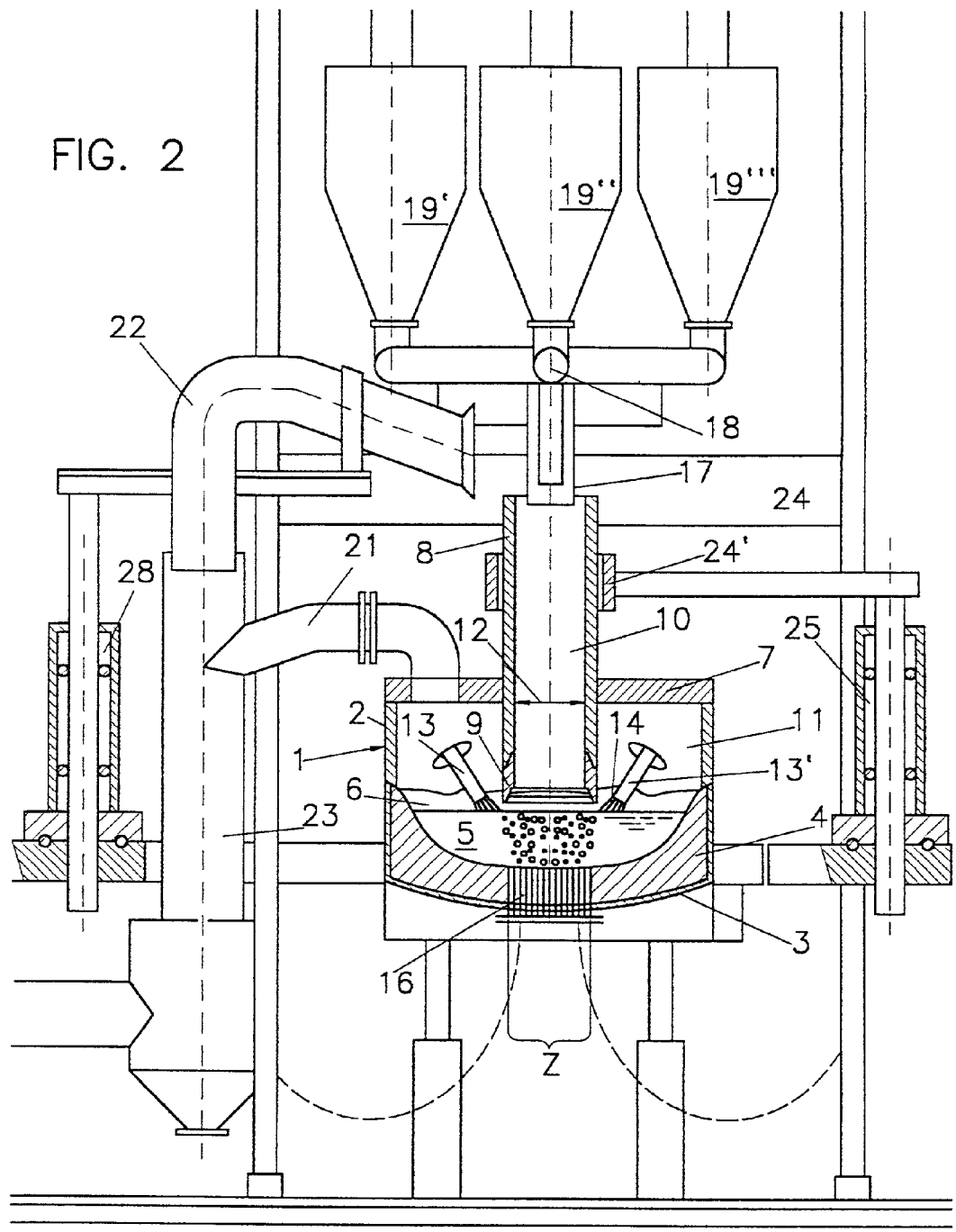
FIG. 2, is a schematic of a frontal view of the plant arrangement shown in FIG. 1.
Figure 3:
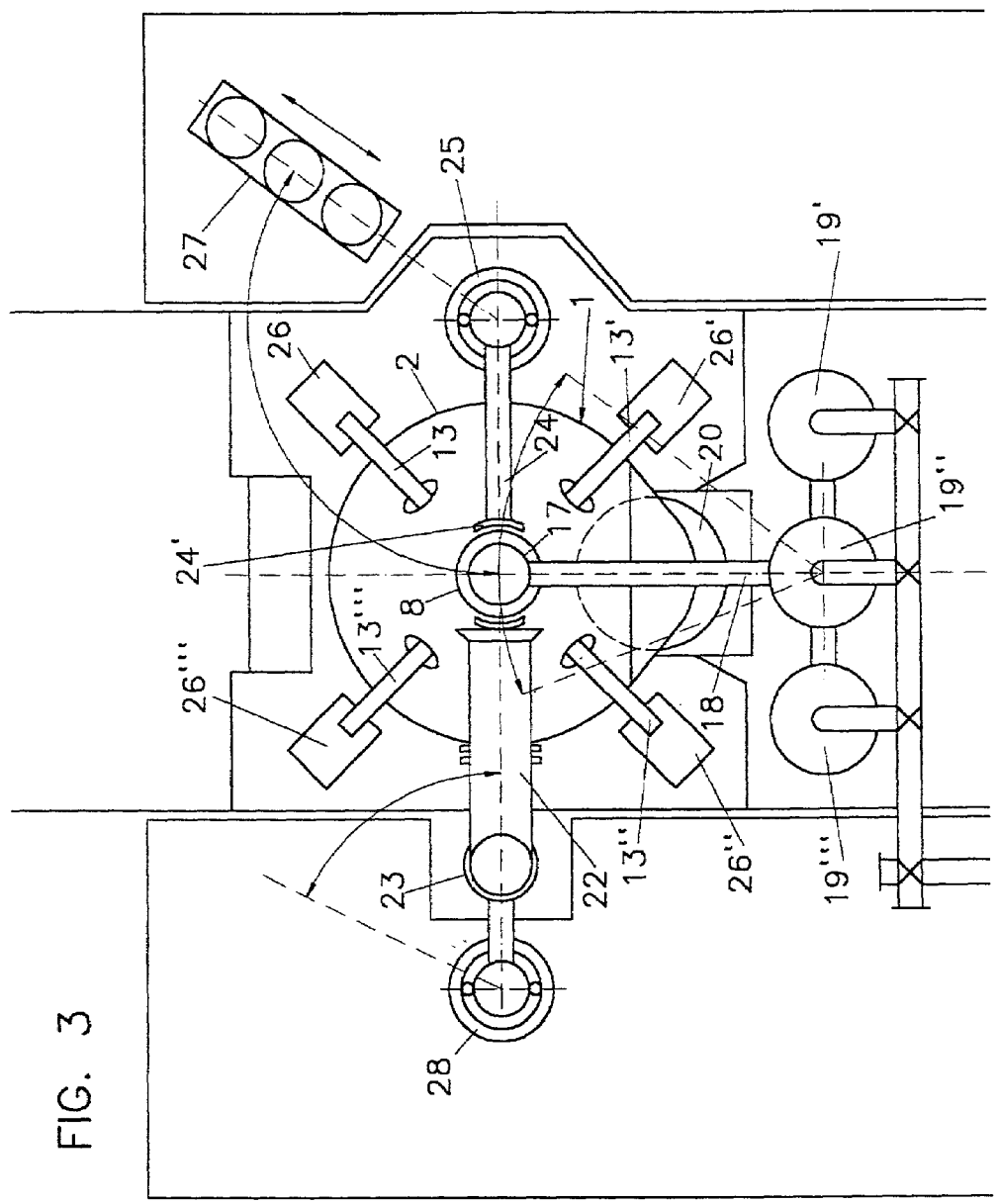
FIG. 3 is a sectional top schematic view of the plant arrangement in FIG. 1.
Figure 4:
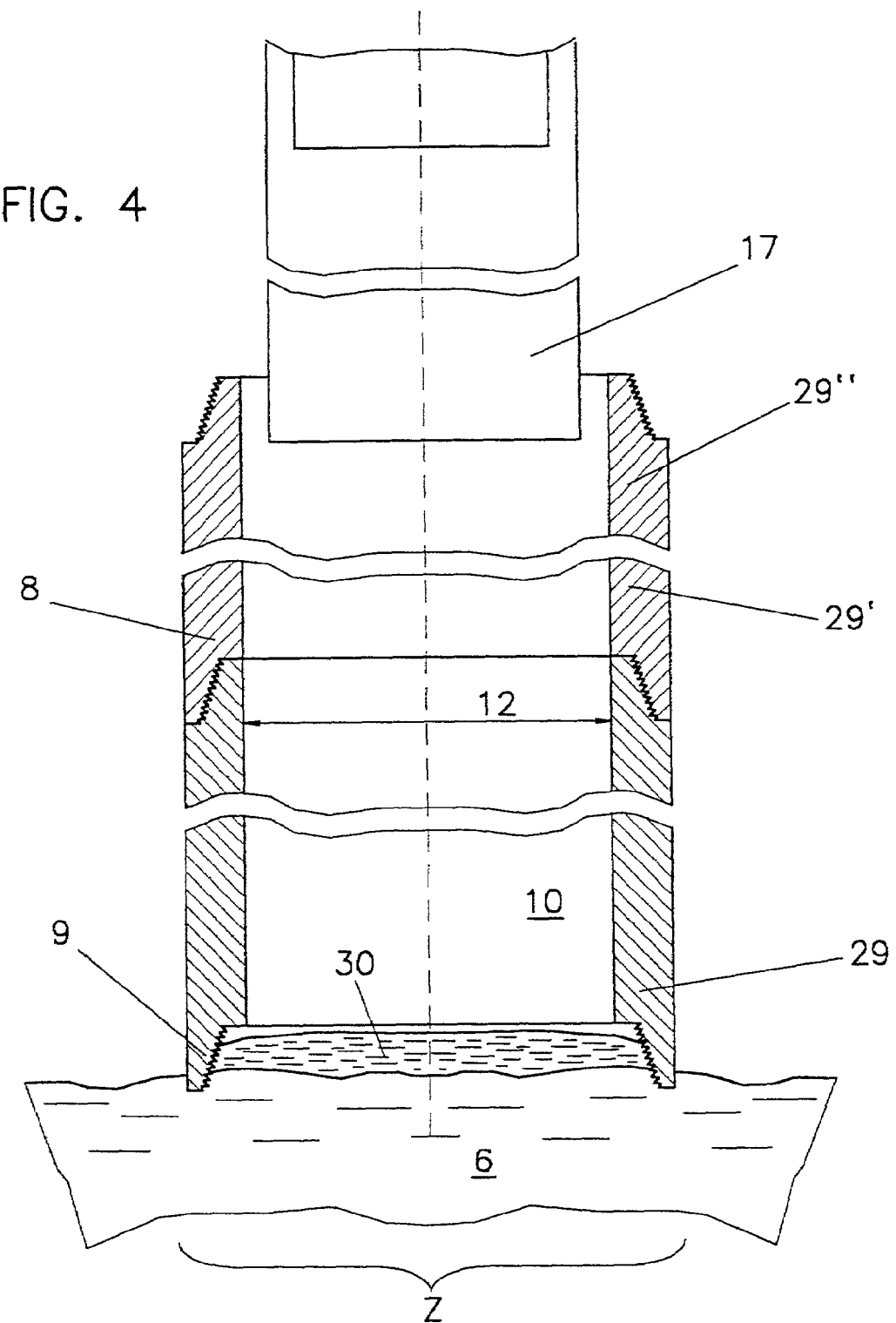
FIG. 4 is a schematic sectional view of the physical state of melt material in a charging tube in accordance with the invention.
Figure 5:
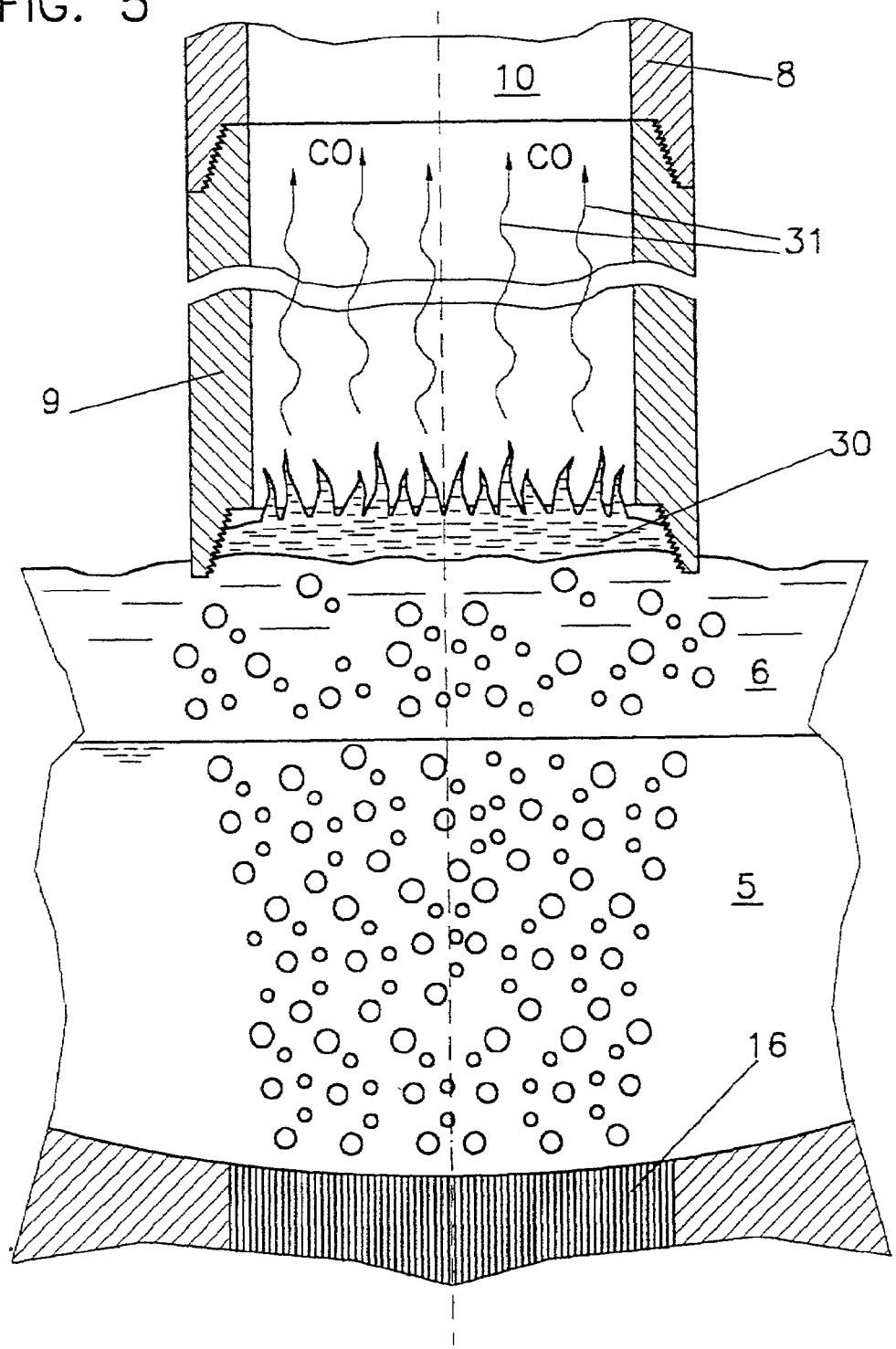
FIG. 5 is a schematic sectional view of the physical state of melt material in the charging tube during use of the invention.

In the following, the invention is described in more detail with reference to several embodiments illustrated in the drawing, wherein FIGS. 1 and 2 each partially depict a schematic illustration of a plant according to the invention in cross-section, FIG. 3 depicts a plant according to the invention seen from above, and FIGS. 4 and 5 depict a schematic cross-sectional illustration of the charging tube as well as of the conditions prevailing at the charging tube outlet.

In a melting furnace 1, in FIG. 1 designed as a tiltable electric arc furnace, comprising a circumferential wall 2, a bottom 3 and a fireproof lining 4, there is a metal melt 5 covering the bottom 3 and a slag layer 6 floating on top of the metal melt 5 which suitably is formed by foamed slag. In the central region (Z) of the melting furnace 1, a thick-walled charging tube 8 expands into the melting furnace 1 through the lid 7 of the melting furnace 1, through which charging tube the metal-containing material is introduced in fine-particulate and/or in lumpy form, and, with its lower end 9 in the following being called the charging tube outlet 9, it dips into the slag layer 6. Hereby, the interior space 10 of the charging tube 8 is spatially separated from the interior space 11 of the melting furnace 1, which interior space is located above the slag layer 6.

Advantageously, the charging tube 8 is manufactured from amorphous carbon or graphite. Advantageously, such a tube has an $Al_2O_3$ coating on the outside, prolonging its lifetime. Using amorphous carbon has the advantage of providing large blocks, so that tube sections having outside diameters of from 300 to 2000 mm (preferably 1000 to 1200 mm), inside diameters of from 200 to 1500 mm (preferably 600 to 800 mm) and lengths of between 500 and 2900 mm may be manufactured therefrom. Furthermore, the material has an electric conductivity which, such as explained in more detail in the following, is used for regulating the positioning of the charging tube 8.

Through the circumferential wall 2 of the melting furnace 1, several electrodes 13 to 13''', in the depicted embodiment four, arranged in a radially symmetrical manner expand, which electrodes are obliquely directed against the centre of the melting furnace 1, i.e. its vertical centre line, and whose electric arcs 14 are enveloped by the slag layer 6. Suitably, the electrodes 13 to 13''' are equally distributed around the circumferential wall 2, through which they expand. In the bottom 3 of the melting furnace 1, there is a tap hole 15 for the metal melt 5. Furthermore, in the bottom 3, at least one flushing stone 16 may be foreseen, through which gases may be passed in order to promote a bath turbulence.

Above the charging tube 8, a charging chute 17 and a conveying device 18 for supplying the metal-containing material are arranged, which material is withdrawn from an inerted and heat insulated bunker 19, in which the metal-containing material gets stored intermediately. The conveying system is arranged at rather a great height above the metal melt 5 and is protected against the hot gas flowing from the charging tube 8 by cooling or a fireproof casing.

The controllable conveying device 18 is inerted and heat insulated as well. In order to better resist the heat radiation coming from below from the melting furnace 1 or the charging tube 8, respectively, the conveying system 18 advantageously is lined with fireproof material on the outside, which results in a longer lifetime of the mechanical components.

Preferably, the charging chute 17 is a multipart design, i.e. it is formed by two or more tubes, whereby the tubes of the charging tube 17 may telescopically slide onto each other, so that the appropriate length of the charging tube 8 rising during the melting process may be adjusted. As materials for the charging tube 17, corundum, graphite, amorphous carbon or a water-cooled construction are suitable. Corundum tubes have the advantage of a longer lifetime due to their thermal resistance. For changing the charging chute 17, the entire structure of the conveying device 18 is swung sideways. After completion of the charging procedure, the conveying device 18 including the charging chute 17 fastened thereto is pivoted away in the direction of the arrow depicted in FIG. 3 in order to protect said chute from any further heat supply.

Below the melting furnace 1, there is a means designed as an industrial truck 20 for moving a tapping ladle, by the aid of which the metal melt 5 may be transported to a subsequent processing step, as well as a floor vehicle 32 for transporting off the slag.

FIG. 2 represents an elevation of the device according to the invention (section according to line II-II of FIG. 1). In the lid 7 of the melting furnace 1, a hot gas duct 21 is illustrated beside the charging tube 8, by means of which hot gas duct the off-gases are removed from the interior space 11 of the melting furnace 1. Furthermore, sideways above the charging tube 8, a secondary suction tube 22 is arranged, which lets off gases flowing from the charging tube 8 and the charging chute 17. Both off-gas flows are united in an off-gas tube 23—which, just as the secondary suction tube 22 or the hot gas duct 21, respectively, is cooled by means of water or water vapour—and together they are supplied to an off-gas purification means. The secondary suction tube 22 is raised and lowered by means of a lifting/swing gear 28, so that a suction opening may always grasp the gases accruing at the upper charging tube outlet from the charging tube 8 and the charging chute 17. For changing the furnace vessel, the secondary suction tube 22 is lifted out of the off-gas tube 23 by means of the lifting/swing gear 28 and is pivoted sideways.

Advantageously, the water vapour being formed or overheated in all water vapour-cooled components of the device according to the invention may be further used for the production of reducing gas, for instance in a reformer, while making use of the sensible heat immanent to it.

A bunker system for material to be charged is made up by three separate bunkers 19', 19'', 19''', two of which are available as buffers during a stop period of the melting furnace 1 or during a melting furnace change and one of which serves as a charging bunker during normal operation.

FIG. 2 further shows that the charging tube 8 is supported by a bracket 24 connected with a lifting/swing gear 25 for moving the charging tube 8, which gear is arranged in the immediate vicinity of the melting furnace 1. Advantageously, the charging tube 8 is fixed to the bracket 24 by means of a clamp 24', which only serves the purpose of supporting. Said bracket is carefully insulated against a bracket-lift mast of the lifting/swing gear 25 and is lifted and lowered by means of a bracket-lift mast, which is exactly designed within the swinging column of the lifting/swing gear 25.

FIG. 3 shows a plant according to the invention from above. In that emodiment, four electrodes 13, 13', 13", 13'" directed towards the centre of the melting furnace 1 and penetrating the circumferential wall 2 of the melting furnace 1 expand into the melting furnace 1, which electrodes are each guided to the electrode slides 26, 26', 26", 26'" and, at uniform intervals, are arranged alongside the circumferential wall 2 of the melting furnace 1. Between two electrode slides 26, 26' and beside the melting furnace 1, the lifting/swing gear 25 is arranged, which enables an upward and downward movement as well as a lateral movement of the charging tube 8 via the bracket 24 keeping the charging tube 8 in its position. Within the swivelling range of the bracket 24, a charging tube changing station 27 movable in the direction of arrow is arranged, permitting a quick replenishing of worn out parts of the charging tube 8 or of complete charging tubes 8.

FIG. 4 shows a section through a charging tube 8 according to the invention whose charging tube outlet 9 is dipping into the slag layer 6. The charging tube 8 is made up of several built-up shots 29, 29', 29", thereby making possible a simple and quick replenishing of worn out parts. Above the slag layer 6, a thin layer 30 of metal-containing material forming in the interior space 10 of the charging tube 8 is illustrated, which layer, as a result of further charging, is pressed into the hot slag layer 6, where it dissolves. Furthermore, the charging chute 17 serving for introducing the metal-containing material and expanding into the charging tube 8 is depicted. The charging tube 8 has an inside diameter 12 of from 200 to 1500 mm, preferably of from 600 to 800 mm, thereby allowing high charging rates.

The schematic illustration in FIG. 5 shows the conditions of the involved reacting agents during the mixing procedure slag-metal melt and during melting of the metal-containing material such as they prevail at the charging tube outlet 9. The reaction of substances and components of the slag contained in the metal-containing material leads to boiling reactions when the metal-containing material hits the slag layer 6, resulting in an increased bath turbulence in the region of the charging tube outlet 9 and hence facilitating the melting of the metal-containing material. In case of charging sponge iron, the reaction of the coal present within the sponge iron and the FeO of the slag results in the generation of carbon monoxide, which rises in the charging tube 8 (depicted by the arrow 31) and is withdrawn via the secondary suction tube 22. In order to further promote the melting of the metal-containing material, as already mentioned, at least one flushing stone 16 may be foreseen in the bottom 3 of the melting furnace 1, through which flushing stone a gas, f.i. nitrogen, may rise into the metal melt 5 as well as into the slag layer 6 and may strengthen the bath turbulence.

In case of a tiltable melting furnace 1, such as illustrated in FIG. 2, a rotary column guiding the lifting/swing gear 25 of the charging tube 8 is placed on top of a tiltable furnace platform, which makes the charging tube 8 tilt as well during tapping. After completion of the charging procedure but prior to tapping, the charging chute 17 is telescopically lifted above the charging tube 8. Also the rotary column guiding the lifting/swing gear 28 for the secondary suction tube 22 is placed on top of a tiltable furnace platform, which makes the secondary suction tube 22 tilt as well during tapping. For that purpose, it first must be brought out of the off-gas tube 23 by means of the lifting/swing gear 28, since said off-gas tube remains stationary and vertical during all operating conditions.

In order to change the melting furnace 1, the electrodes 13 are brought out of the melting furnace 1, and the charging tube 8 is lifted above the furnace lid 7 and is swung towards the charging tube maintenance and/or changing station 27. For that purpose, the rotary column guiding the lifting/swing gear 25 on the tiltable furnace platform advantageously is rotatably run on bearings on a roller bearing-live ring. Additionally, the secondary suction tube 22 is lifted out of the off-gas tube 23 and pivoted sideways by means of the lifting/swing gear 28. The melting furnace itself is taken to a repair station by means of a crane and is freshly bricked there.

Changing the melting furnace 1 by means of a crane is feasible within approximately two to five hours.

The functioning of the device is as follows:

The metal-containing material, in particular sponge iron, which may be present both in fine-particulate and in lumpy form, is withdrawn from one of the inerted, heat insulated bunkers 19 to 19", which advantageously immediately adjoin a direct reduction plant and hence integrate the melting device directly into the discharge of the direct reduction plant. Alternately, one of the bunkers 19 to 19" each serves as a charging bunker, whereas the other two bunkers are used as buffers in order to bridge the time for changing or maintaining the melting furnace 1 or for emptying and starting, respectively, the same. For normal production, however, only the throughput through one of the bunkers 19 to 19" is foreseen. Suitably, bunkers for aggregates, such as fine lime, lump lime, dolomite etc., are available as well.

The metal-containing material conveyed via the conveying device 18 and the charging chute 17 gets directly into the charging tube 8, where it drops solely by gravity.

With a steel melting furnace for, e.g., a throughput of 150 t/h of the metal-containing material, the entire length of the charging tube 8 amounts to approximately 7000 mm. For that conveying rate, the outside diameter of the charging tube 8 amounts to approximately 1200 mm and the inside diameter to approximately 800 mm.

It is necessary that, during the charging process, the charging tube 8 always dips into the slag layer 6 because only that prevents any fine-particulate material from being blown out of the charging tube 8 by a stack effect. The insertion depth of the charging tube outlet 9 amounts to at least 10 mm. The charging tube 8 and also the secondary suction tube 22 have to be moved upwards to the same extent—preferably synchronously—to which the metal melt and the slag layer levels, respectively, rise by charging and melting the metal-containing material, whereby also the height of the slag layer 6 must be considered.

That object is met by regulating the height of the charging tube outlet 9 in correspondence with the charging rate of the metal-containing material. Additionally, an auxiliary voltage is fed to the charging tube 8, and a current conduction is established from the charging tube 8 to the ground anode (D.C. furnace) via the conductive liquid slag layer 6 or to the secondary electrode or the furnace vessel (rotary current furnace), respectively. If the charging tube 8 leaves the conductive slag layer, the current conduction is interrupted.

The regulation is performed such that the charging tube 8 is lowered at the beginning of the melting process until the voltage and/or current measuring indicates a contact with the slag. The distance measuring system incorporated in the charging tube-lift mast regulates a further lowering and hence dipping into the slag layer 6 for a depth of at least 10 mm, whereupon charging of the metal-containing material is started. Subsequently, depending on the conveying rate of the melting material, the charging tube 8 is slowly drawn upwards corresponding to the increase of the level of the slag layer 6. In doing so, the voltage and/or current measuring serves for constantly monitoring the insertion of the charging tube outlet 9 into the slag layer 6.

Dipping too deep into the slag layer 6 is prevented in the same way. A charging tube 8 submerged too deeply might "lock in" the charged material on the slag and hinder a melting of the hot slag or lead to the "formation of icebergs", respectively. In order to enable a quick melting of the metal-containing material while making use of the slag turbulence caused by the electric arcs 14, it must be taken care of that the melting material is always fed onto the surface of the thin-liquid slag layer 6 heated by the electric arcs 14.

The metal-containing material is melted by falling on the numerous froth bubbles of the foamed slag, penetrating the pellicles of those froth bubbles, dropping deeper into the slag layer 6 and the metal melt 5, respectively, and thus melting. Therefore, no solid layer forms in the charging tube 8, if the charging rate and the electric power charge are correctly matched with each other. A suitable charging rate achieves that the metal-containing material is pressed into the slag layer 6 by its weight. With sponge iron as the charged material, a boiling reaction caused by the reaction of the carbon and the non-reduced iron oxides with the FeO of the hot slag occurs—such as mentioned by way of FIG. 5—in the charging tube 8 when the sponge iron strikes the slag, which boiling reaction facilitates the melting of the sponge iron particles.

For starting the metallurgical melting furnace 1, advantageously scobs and subsequently possibly shredder scrap are charged from storage bunkers through the slightly drawn up charging tube 8 into the melting furnace 1 onto a heap and are melted to a liquid sump with or without the aid of a gas-oxygen-burner. Suitably, that start scarp is charged into the completely lined melting furnace 1 to be newly applied already at a furnace vessel changing station and then the new melting furnace 1 is charged with start scrap. Slag formers may be added through the charging tube 8 or also directly into the melting furnace 1.

Preferably, melting the metal-containing material is carried out by several electric arcs 14 originating from the oblique graphite electrodes 13 laterally expanding into the melting furnace 1. Advantageously, the electric arcs 14 burn on a partial circle approximately in the centre between the melting edge and the charging tube 8. The electric arcs 14 may be directed radially towards the centre of the melting furnace 1 or also tangentially towards a partial circle. By changing the electrode stroke and the inclination of the electrodes, the electric arcs are variable with regard to their distance from the point where the fine-particulate charging material strikes the slag surface. The electric arcs 14 cause a turbulence of the slag layer 6 and an essentially superficial turbulence not going too deep of the metal melt 5, which turbulence promotes the melting of the metal-containing material. The electrodes 13 advantageously being inclined by 20 to 70° to the horizontal line generate oblique electric arcs 14, which, due to their inclination, are enveloped by the slag layer 6 completely or at least to a great extent, so that reradiation losses are minimized.

Although no melting flow passes through the charging tube 8, it wears out at its lower end 9. Therefore, it is foreseen to change the worn out shots 29 by newly screwed on ones. That is done at the charging tube maintenance and/or changing station 27. A new charging tube 8 may directly be taken out of the movable charging tube maintenance and/or changing station 27 by the charging tube bracket 24 and may be brought back into the melting position.

The dust forming during the melting process is sucked out of the furnace space 11 via the hot gas duct 21 or out of the charging tube 8 via the secondary suction tube 22, respectively, and may be fed back into the direct reduction plant as a charging material, for example, during the subsequent formation of sponge iron.

The advantages of the method of the invention and of the device of the invention, respectively, are as follows:

Continuous direct steel production process during which, at the beginning, ore dust is fed into the ore dust direct reduction plant and, in the end, liquid steel is tapped from the metallurgical melting furnace.

Omission of all logistic and storage means between a direct reduction plant and the steel works.

By far lower investment costs and substantially lower production costs of the metal melt.

Complete utilization of the favourable ore dust price without the disadvantage of additionally necessary investments.

Utilization of the energy immanent to the hot metal-containing material, such as sponge iron, for lowering the necessary melting energy consumption without any particular plant-related technical expenditures.

Favourable environmental relevancy: Dust separated from the sponge iron during the melting process is collected and may again be charged into a direct reduction plant and be reused. No dumping ground and hence no additional costs are necessary. Output improvement by approximately 1.5%.

Low noise level and small strain on the electric grid due to the multi-electrode principle of the electric arc furnace.

All process steps simple, without technical risks, since already tested or employed on a commercial scale in another configuration.

High availability of the melting aggregate due to several oblique electrodes. Easy spare parts management due to great number of identical components.

High quality of the liquid material produced, since consisting of virgin material by nearly 100%.

Great melting capacity of the electric arc furnace, since the charging material is fed into the energy centre.

Utilization of the cooling water vapour for producing reducing gas.

Another area of applying the described charging and melting principle also to iron carbide, lumpy sponge iron and all kinds of dusts as well as to nonferrous metals.

We claim therefore:

1. A method for melting down metal-containing material which comprises:

providing a metallurgical melting furnace having an interior space, a metal melt material located in the interior space of the furnace, and a slag layer floating on top of the metal melt material;

conveying the metal containing material directly into a central region of the melting furnace through at least one charging tube having an opening dipping permanently into the slag layer, wherein the position of the charging tube and the insertion depth of the lower end of the charging tube into the slag layer is regulated during melting, applying energy by directing electric arcs toward the metal melt wherein the electric arcs are directed obliquely against the central region of the furnace thereby forming an energy centre in the region of the lower end of the charging tube to provide a surplus amount of energy for melting the metal-containing material, melting the metal-containing material in the slag layer, and mixing the slag metal melt.

2. A method according to claim 1 comprising applying energy in a location proximate to the opening of the charging tube.

3. A method according to claim 1 comprising conveying metal containing material in at least one selected from the group consisting of a lumpy form and fine particulate form to the furnace.

4. A method according to claim 1 comprising conveying metal containing material at a temperature of between 500° C. and 1000° C. into the furnace wherein the metal containing material is obtained from a reduction process.

5. A method according to claim 4 comprising conveying metal containing material at a temperature of between 600° C. and 700° C.

6. A method according to claim 1 wherein the slag layer comprises foamed slag.

7. A method according to claim 6 comprising applying gaseous oxygen to the slag layer to form the foamed slag.

8. A method according to claim 6 comprising adding fine-grained carbon to the slag and applying oxygen onto the slag to form the foamed slag.

9. A method according to claim 1 comprising conveying the metal containing material into the furnace exclusively by gravity.

10. A method according to claim 1 further comprising positioning the charging tube in the slag layer as a function of the rate of conveying the metal-containing material.

11. A method according to claim 1 wherein the charging tube is electrically conductive and further comprising providing a voltage measurement device and positioning the charging tube in the slag as a function of voltage measured by the voltage measurement device.

12. A method according to claim 1 wherein the charging tube is electrically conductive and further comprising providing a current measurement device and positioning the charging tube in the slag layer as a function of current measured by the current measurement device.

13. A method according to claim 1 further flushing the furnace with a gas.

14. A method according to claim 1 wherein the melting down process is a continuous process, and wherein the level of the melt layer in the furnace is continuously maintained.

15. A method according to claim 14 wherein the slag layer in the furnace is continuously maintained.

16. A method according to claim 1 further comprising cooling the melting furnace and forming water vapor.

* * * * *